United States Patent
Dai (10) Patent No.: US 8,977,043 B2
(45) Date of Patent: Mar. 10, 2015

(54) METHOD OF IMAGE DEPTH ESTIMATION AND APPARATUS THEREOF

(75) Inventor: Qing-Hua Dai, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 355 days.

(21) Appl. No.: 13/541,668

(22) Filed: Jul. 4, 2012

(65) Prior Publication Data

US 2013/0050201 A1 Feb. 28, 2013

(30) Foreign Application Priority Data

Aug. 23, 2011 (CN) .......................... 2011 1 0242381

(51) Int. Cl.
G06K 9/00 (2006.01)
G06T 7/00 (2006.01)
H04N 13/02 (2006.01)
G06T 7/40 (2006.01)

(52) U.S. Cl.
CPC .......... *G06T 7/0059* (2013.01); *H04N 13/0257* (2013.01); *H04N 13/026* (2013.01); *H04N 13/0271* (2013.01); *G06T 7/408* (2013.01); *G06T 2207/10024* (2013.01)
USPC ...................................................... 382/162

(58) Field of Classification Search
USPC ........................... 382/162, 163, 164, 165, 167
See application file for complete search history.

(56) References Cited

U.S. PATENT DOCUMENTS

| 6,782,125 | B2 * | 8/2004 | Lee et al. | 382/162 |
| 2006/0251323 | A1 * | 11/2006 | MacKinnon et al. | 382/167 |
| 2011/0050864 | A1 | 3/2011 | Bond | |
| 2011/0188773 | A1 | 8/2011 | Wei et al. | |
| 2011/0211754 | A1 * | 9/2011 | Litvak et al. | 382/165 |
| 2012/0057785 | A1 * | 3/2012 | Morovic et al. | 382/167 |

OTHER PUBLICATIONS

Qingqing Wei, "Converting 2D to 3D: A Survey", Research Assignment for Master Program Media and Knowledge Engineering of Delft University of Technology, Dec. 2005, p. 1~43.
Shapiro et al., "Computer Vision", 2001, p. 279~325, ISBN 0-13-030796-3.
Torr et al., "Feature Based Methods for Structure and Motion Estimation", ICCV '99 Proceedings of the International Workshop on Vision Algorithms: Theory and Practice, 2000, p. 278~294.
Jung et al., "Elimination of Blocky Artifacts in Predictive Video Coding", Proc. SPIE, 1998, p. 232~240, vol. 3309.
Boykov et al., "Fast Approximate Energy Minimization via Graph Cuts", IEEE Transactions on Pattern Analysis and Machine Intelligence, Nov. 2001, p. 1222~1239, vol. 23, No. 11.
Alvy Ray Smith, "Color Gamut Transform Pairs", Computer Graphics (Proceedings of SIGGRAPH 90), Aug. 1978, p. 12~19, vol. 12, No. 3.
"Office Action of Taiwan Counterpart Application", issued on Aug. 15, 2014, p. 1-p. 7, in which the listed reference was cited.

* cited by examiner

*Primary Examiner* — Brian Le
(74) *Attorney, Agent, or Firm* — Jianq Chyun IP Office (57) ABSTRACT

A method and an apparatus of image depth estimation are provided. The method includes the following steps. First, a hue value of each pixel in an image is calculated by comparing all color components of each pixel in the image. The hue value of each pixel in the image is associated with a corresponding value, wherein the corresponding value is a first numerical value or a second numerical value. Then, according to the corresponding value of each pixel in the image, a depth value of each pixel in the image is calculated, in which the depth value is used to convert the image into a three-dimensional (3D) image to be displayed on a 3D display apparatus.

26 Claims, 8 Drawing Sheets

METHOD OF IMAGE DEPTH ESTIMATION AND APPARATUS THEREOF

CROSS-REFERENCE TO RELATED APPLICATION

This application claims the priority benefit of China application serial no. 201110242381.0, filed on Aug. 23, 2011. The entirety of the above-mentioned patent application is hereby incorporated by reference herein and made a part of this specification.

BACKGROUND OF THE INVENTION

1. Field of the Invention

The present invention relates to an image processing method and an apparatus thereof, and in particular, to a method of image depth estimation and an apparatus thereof.

2. Description of Related Art

In recent years, a three-dimensional (3D) image display is gradually popular, and requirements for 3D image data are gradually higher. However, most of image data is still two-dimensional (2D) data. When an original 2D image is converted into a 3D image, image depth is an important parameter in the conversion. The image depth refers to a distance from a view port to an object in the image, and can be used to generate two somewhat different images on the left and right for a left eye and a right eye to watch respectively, so that a user has a feel of watching a 3D image by taking advantage of parallax between the eyes. However, since the algorithm is very complex, real time 2D-to-3D image conversion is very difficult. Therefore, how to rapidly obtain a parameter, for example, a depth value of each pixel in the image, required by the 2D-to-3D image conversion is an important topic. In the conventional technology, in some methods, depth value estimation is accelerated by using information among frames. For example, the depth value is estimated by using an object moving distance in successive frames of a video film. However, when a scene or a main object in the image changes or rapidly moves, the depth value of the each pixel cannot be accurately estimated through this method. Moreover, when a front and back relation of the object in the image is indefinite, for example, a front object masking a back object does not exist, the image depth estimation is also difficult.

SUMMARY OF THE INVENTION

The present invention provides a method of image depth estimation, which includes the following steps. First, a hue value of each pixel in an image is calculated by comparing all color components of each pixel in the image. The hue value of each pixel in the image corresponds to a first numerical value or a second numerical value to be regarded as a corresponding value. Then, according to the corresponding value of each pixel in the image, a depth value of each pixel in the image is calculated, in which the depth value is used to convert the image into a 3D image to be displayed on a 3D display apparatus.

The present invention provides an apparatus of image depth estimation, which includes a memory and a processor, in which the memory is used to store an image. The processor calculates a hue value of each pixel in an image by comparing all color components of each pixel in the image, associate the hue value of each pixel in the image with a corresponding value, wherein the corresponding value is a first numerical value or a second numerical value, and according to the corresponding value of each pixel in the image, calculates a depth value of each pixel in the image, in which the depth value is used to convert the image into a 3D image to be displayed on a 3D display apparatus.

The present invention provides a method of image depth estimation, which includes the following steps. First, each pixel in an image corresponds to a first numerical value or a second numerical value to be regarded as a corresponding value by comparing all color components of each pixel in the image. Then, according to the corresponding value of each pixel in the image and a corresponding value of a peripheral pixel, a depth value of each pixel in the image is calculated, in which each of the peripheral pixels is disposed beside the image in a preset direction, and the depth value is used to convert the image into a 3D image to be displayed on a 3D display apparatus.

Based on the foregoing, through the present invention, the depth value of each pixel in the image can be estimated rapidly, so that a 2D image can be more rapidly converted into a 3D image to be displayed on the 3D display apparatus.

In order to make the features and advantages of the present invention clearer and more comprehensible, the present invention is described in detail below with reference to embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
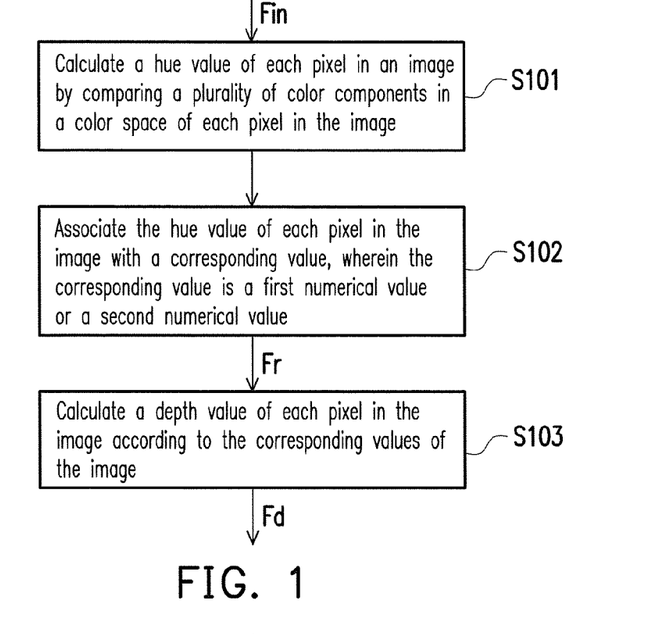
FIG. 1 is a flow chart of steps of a method of image depth estimation according to an embodiment of the present invention.

FIG. 1 is a flow chart of steps of a method of image depth estimation according to an embodiment of the present invention. Referring to FIG. 1, in this embodiment, an input image Fin is in unit of frame. In the method of image depth estimation in FIG. 1, only one 2D image is processed once, so only one frame is processed once for a video film. In Step S101, a hue value of each pixel in an input image Fin is calculated by comparing all color components of each pixel in the input image Fin. In Step S102, associate the hue value of each pixel in the input image Fin with a preset first numerical value or a preset second numerical value to obtain a corresponding value Fr of the pixel. In this embodiment, the first numerical value is 0, and the second numerical value is 1, but in actual applications, the present invention is not limited thereto. In other embodiments, two different corresponding values may be set. In Step S103, a depth value Fd of each pixel in the input image Fin is calculated according to the corresponding value Fr of each pixel in the input image Fin. The depth value Fd may be used to convert the input image into a 3D image for a display with a 3D image display function to display. The steps are described in detail below with reference to drawings.

Figure 2:
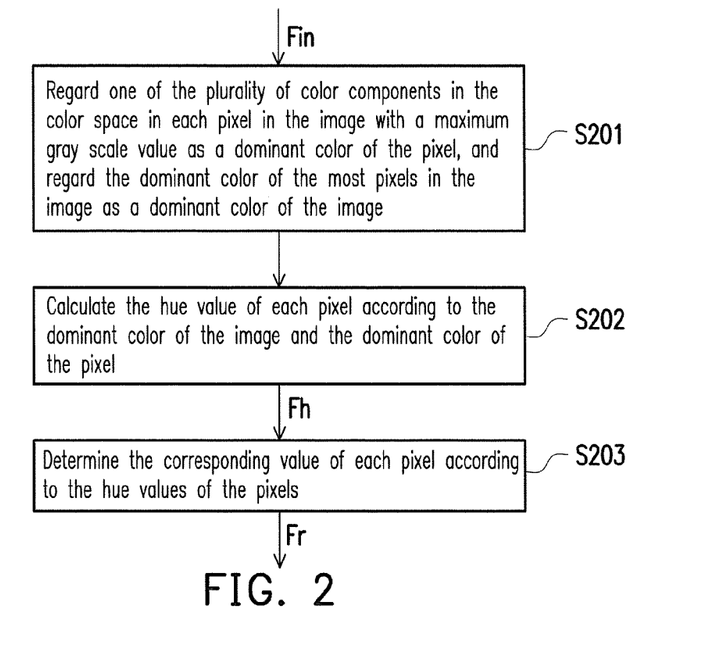
FIG. 2 is a flow chart of steps of associating each pixel of an image with a corresponding value by comparing all color components of each pixel in the image according to an embodiment of the present invention.

FIG. 2 is a flow chart illustrating Step S101 and Step S102 in detail. In this embodiment, the input image Fin is described with a Red, Green, and Blue (RGB) color space, so the input image has three RGB color components. However, it should be known by persons skilled in the art that, the color space of the input image Fin is not limited herein. Referring to FIG. 2, in Step S201, all color components of each pixel in the input image Fin are compared. For each pixel, a color component with a maximum gray scale value is regarded as a dominant color of the pixel. For example, if in three RGB color components of a certain pixel, a gray scale value of the blue color component is the maximum, a dominant color of the pixel is a blue color. The dominant color of the most pixels in the image Fin is regarded as a dominant color of the image Fin. For example, if the dominant color of most of all the pixels of the image Fin is a red color, the dominant color of the image Fin is the red color. In this embodiment, the image Fin is the RGB color space, which indicates that the dominant color of the image Fin and each pixel each is one of the red color, a green color, or the blue color.

Referring to FIG. 2 continuously, in Step S202, a hue value of each pixel is calculated according to the dominant color of the image Fin and the dominant color of each pixel. Since the dominant color of the image Fin and each pixel each is one of the red color, the green color, and the blue color, it can be known that, nine combinations of the dominant color of the image Fin and the dominant color of each pixel exist. In one embodiment, in Step S202, the hue value of each pixel in the image Fin may be calculated according to color components of the dominant colors of the image Fin and each pixel in three primary colors (RGB). Nine formulas for calculating the hue value of each pixel in the image Fin also exist and correspond to the nine dominant color combinations respectively, as shown in Table 1. Fh is a hue value of a pixel, R, G, and B are gray scale values of the red, green, and blue color components of the pixel respectively, and the function min( ) is used to take a smaller value from two values input into the function. It should be specially noted that, after the hue value Fh of each pixel in the image Fin is obtained according to a calculation formula in Table 1, a normalization calculation is further needed. The normalization calculation is multiplying the hue value Fh by a preset value or dividing the hue value Fh by a preset value to control a range of the hue value Fh. Moreover, if a hue value Fh is smaller than zero, a preset value may also be added to the Fh to ensure that the hue values Fh of all the pixels are greater than or equal to zero. This addition operation may also be included in the normalization calculation. In Step S203, a corresponding value Fr of each pixel is determined according to the hue value Fh of each pixel.

TABLE 1

| Image Dominant Color | Pixel Dominant Color | Calculation Formula of a Hue Value |
|---|---|---|
| Red | Red | Fh = 3 + (G-B)/[R-min(G, B)] |
| Red | Green | Fh = 5 + (B-R)/[G-min(B, R)] |
| Red | Blue | Fh = 1 + (R-G)/[B-min(R, G)] |
| Green | Red | Fh = 5 + (G-B)/[R-min(G, B)] |
| Green | Green | Fh = 1 + (B-R)/[G-min(B, R)] |
| Green | Blue | Fh = 3 + (R-G)/[B-min(R, G)] |
| Blue | Red | Fh = 1 + (G-B)/[R-min(G, B)] |
| Blue | Green | Fh = 3 + (B-R)/[G-min(B, R)] |
| Blue | Blue | Fh = 5 + (R-G)/[B-min(R, G)] |

Figure 3:
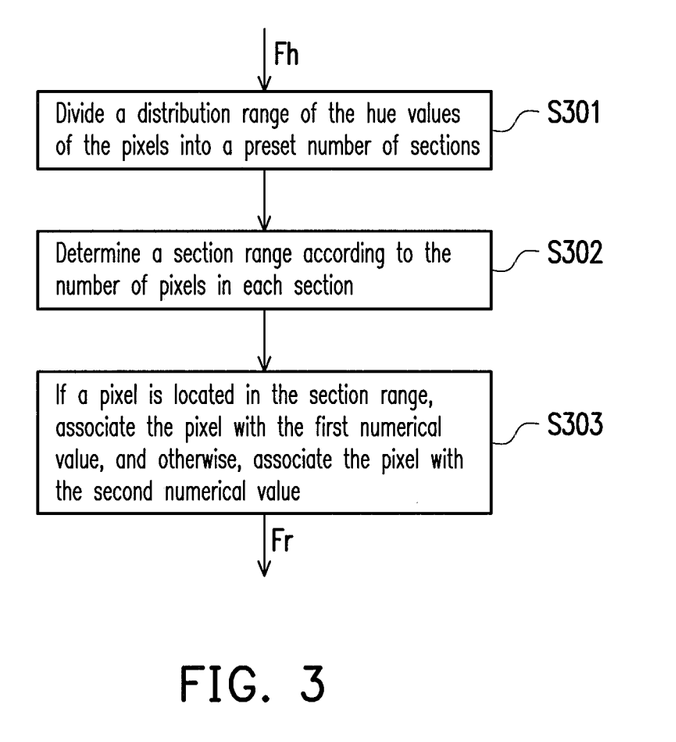
FIG. 3 is a flow chart of a step of determining a corresponding value of the pixel according to a hue value of the pixel according to an embodiment of the present invention.

FIG. 3 is a flow chart of Step S203. Referring to FIG. 3, in Step S301, statistics of the hue values Fh of the pixels in the image is gathered, and a maximum Fhmax and a minimum Fhmin of the hue values Fh are found. The maximum Fhmax and the minimum Fhmin of the hue values Fh defines a distribution range of the hue values Fh. The distribution range is divided into a preset number of sections. For example, if the statistics shows that the maximum Fhmax and the minimum Fhmin of the hue values Fh are 0.7 and 0.4 respectively and the preset number is 10, the distribution range is divided between 0.4 and 0.7 into 10 intervals each with a size of 0.03. After the distribution range is divided into the preset number of sections, in Step S302, a section range is determined according to the number of pixels in the section. In Step S303, pixels in the section range correspond to the first numerical value, and pixels outside the section range correspond to the second numerical value. Step S302 of determining the section range according to the number of pixels in the section is described in detail below with reference to FIG. 4, and actual implementation is explained with reference to FIG. 5A and FIG. 5B.

Figure 4:
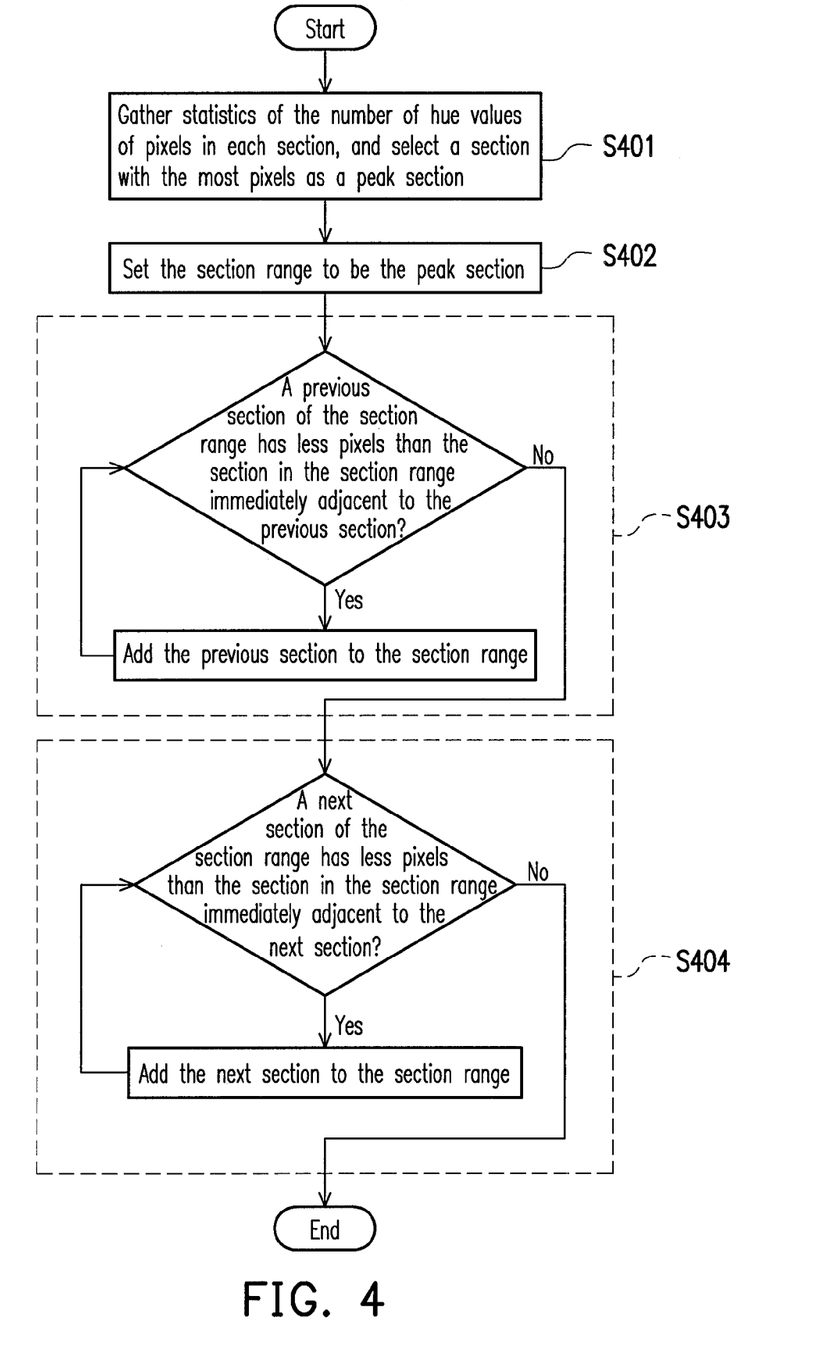
FIG. 4 is a flow chart of a step of determining a section range according to the number of pixels in a section according to an embodiment of the present invention.

FIG. 4 is a flow chart of Step S302. Referring to FIG. 4, in Step S401, statistics of the number of pixels with hue values Fh in each section is first gathered, and a section with the most pixels is selected as a peak section. In Step S402, the section range is set to be the peak section. The section range is expanded according to implementation conditions of Step S403 and Step S404, and an implementation order of Step S403 and Step S404 may also be reversed. In Step S403, if the number of pixels in a previous section of the section range is less than that in a section in the section range immediately adjacent to the previous section, the previous section is added to the section range, and the determination and addition actions are repeated continuously until no more sections preceding the section range can be added. In Step S404, if the number of pixels in a next section of the section range is less than that in a section in the section range immediately adjacent to the next section, the next section is added to the section range, and the determination and addition actions are repeated continuously until no more sections following the section range can be added.

Figure 5A:
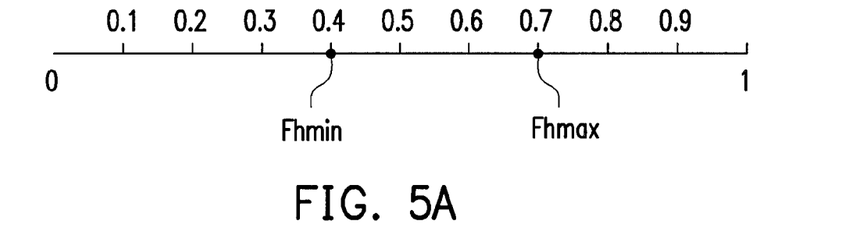
FIG. 5A and FIG. 5B are an exemplary embodiment of the step of determining the section range according to the number of pixels in the section according to an embodiment of the present invention.
Figure 5B:
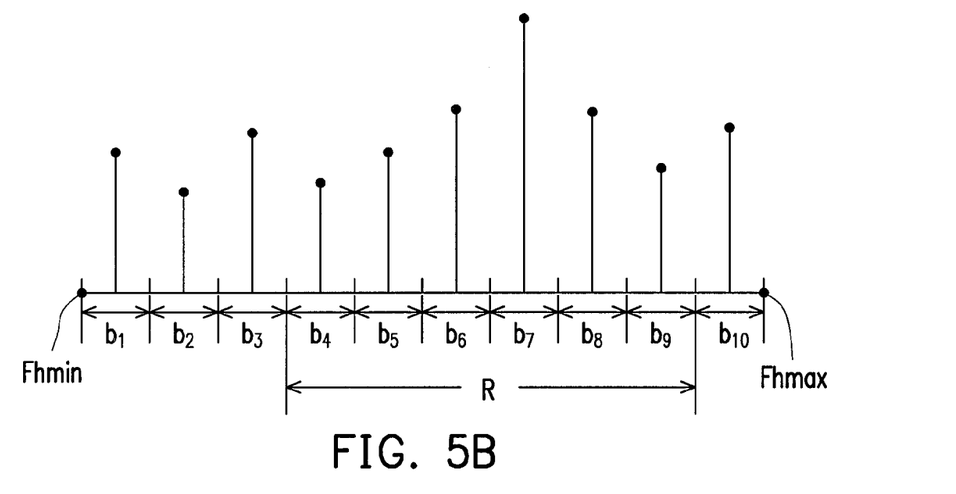

FIG. 5A and FIG. 5B depict an exemplary embodiment of Step S302. Referring to FIG. 5A, it is assumed that the hue value Fh of the pixel in the image Fin is between 0 and 1. In this exemplary embodiment, the maximum Fhmax and the minimum Fhmin of the hue value are 0.7 and 0.4, as shown in FIG. 5A. As shown in FIG. 5B, two ends of the distribution is the maximum Fhmax and the minimum Fhmin of the hue value of the pixel. In this exemplary embodiment, the preset number is 10, so a range from the maximum Fhmax to the minimum Fhmin of the hue value is divided into 10 equal parts to obtain sections b1 to b10.

Referring to FIG. 5B continuously, in FIG. 5B, a histogram represents the numbers of pixels with the hue values Fh in the sections b1 to b10. The higher vertical line indicates that the hue values Fh of more pixels fall in the section. The section b7 has the most pixels, so the section b7 is selected as the peak section, and the section range R is set to be the section b7. The previous section b6 of the section b7 is compared with the section b7, and it can be known from the histogram that, b7 has more pixels, so the section b6 is added to the section range R. In a similar way, the sections b5 and b4 are also added to the section range R. The number of pixels in the section b3 is greater than that in the section b4, so the section b3 is not added to the section range R, and the forward addition action is stopped. It can also be determined whether to add the sections b8 to b10 following the section b7 in the section range R according to the same determination conditions. As a result, the sections b8 and b9 are also be added to the section range R. The number of pixels in the section b10 is greater than that in the section b9, so the section b10 is not added to the section range R, and the backward addition action is stopped. As a result, the section range R includes the section b4 to b9. The corresponding value of pixels in the section range R, that is, pixels in the sections b4 to b9, is set to be the first numerical value 0. The corresponding value of pixels outside the section range R, that is, pixels in the sections b1 to b3 and b10, is set to be the second numerical value 1.

Figure 6:
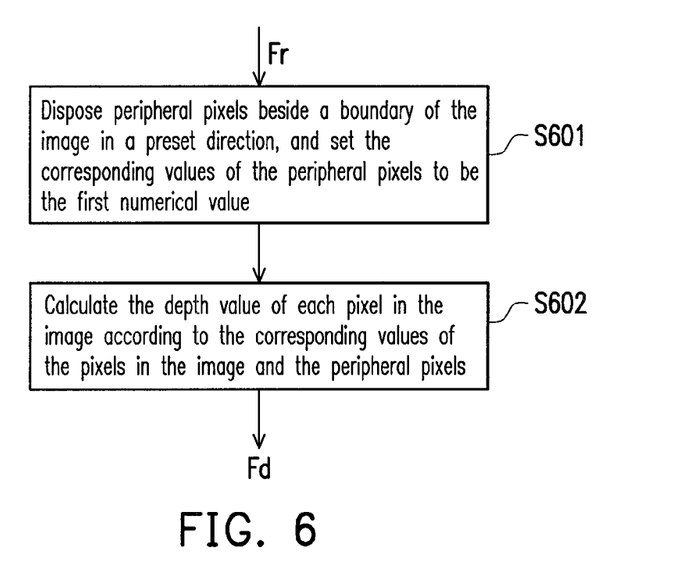
FIG. 6 is a flow chart of a step of calculating a depth value of each pixel in the image according to the corresponding value of the image according to an embodiment of the present invention.

FIG. 6 is a flow chart of Step S102. Referring to FIG. 6, in Step S601, peripheral pixels are disposed beside a boundary of the image in a preset direction, and a corresponding value of each peripheral pixel is set to be the first numerical value. The peripheral pixel is not a real pixel in the image, but is set to be used to calculate the depth value. In Step S602, the depth value of each pixel in the image is calculated according to the corresponding values of each pixel in the image Fin and the peripheral pixels. The Step S602 is described in detail below with reference to drawings.

Figure 7:
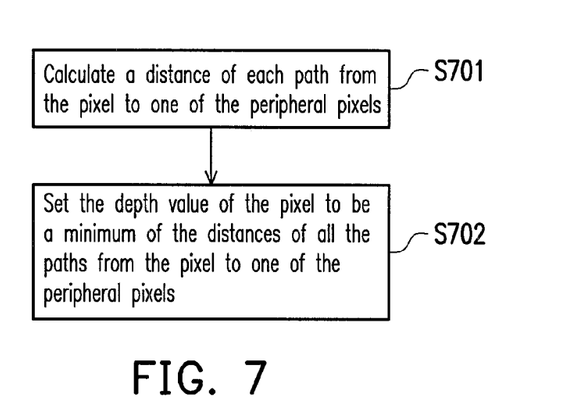
FIG. 7 is a flow chart of the step of calculating a depth value of each pixel in the image according to the corresponding values of the pixel in the image and a peripheral pixel according to an embodiment of the present invention.

FIG. 7 is a flow chart of Step S602. Referring to FIG. 7, in Step S701, a distance of a path from each pixel in the image to one of the peripheral pixels is calculated by using the corresponding value of the pixel. It should be noted that, the path from the pixel to the peripheral pixel is only allowed to turn at right angle in the image. The distance of the path is calculated as a sum of absolute values of differences between the corresponding values of each two adjacent pixels of the path. The calculation method indicates that, a starting point and the end point of the path are the pixel and a certain peripheral pixel respectively. It should be specially noted that, an absolute value of a difference between the peripheral pixel and the previous pixel thereof still needs to be calculated and added to the sum. In Step S702, the distances of all the paths of the pixel are compared, and a minimum of the distances of all the paths of each pixel is set to be the depth value of the pixel. An example is described below with reference to drawings.

Figure 8A:
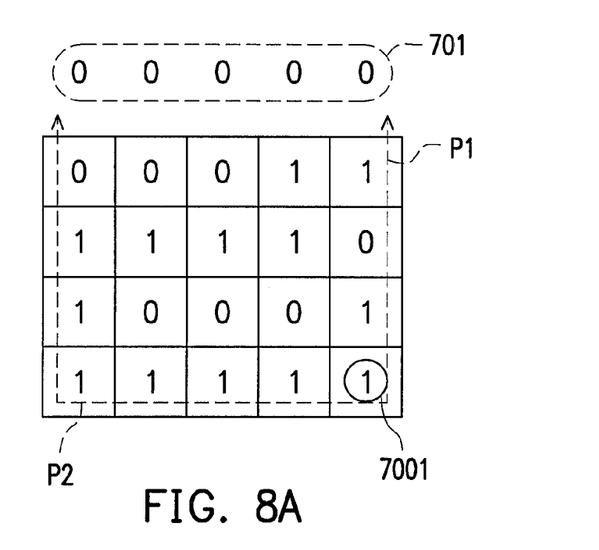
FIG. 8A and FIG. 8B are schematic diagrams of an implementation manner of calculating a distance of a path from a pixel to a peripheral pixel according to an embodiment of the present invention.

FIG. 8A and FIG. 8B are schematic diagrams of an implementation manner of calculating a distance of a path from a pixel to a peripheral pixel according to an embodiment of the present invention. Referring to FIG. 8A, in this embodiment, a set preset direction is an upward direction of an image, so peripheral pixels 701 are disposed beside an upper boundary of the image. In other embodiments, the preset direction may be set to be any one of upward, downward, leftward, rightward directions. A pixel 7001 is taken as an example. Paths P1 and P2 are two of all paths from the pixel 7001 to one of the peripheral pixels. A distance of the path P1 is as follows:

$$|1-1|+|1-0|+|0-1|+|1-0|=3 \qquad (1)$$

A distance of the path P2 is as follows:

$$|1-1|+|1-1|+|1-1|+|1-1|+|1-1|+|1-1|+|1-0|+|0-0|=1 \qquad (2)$$

Figure 8B:
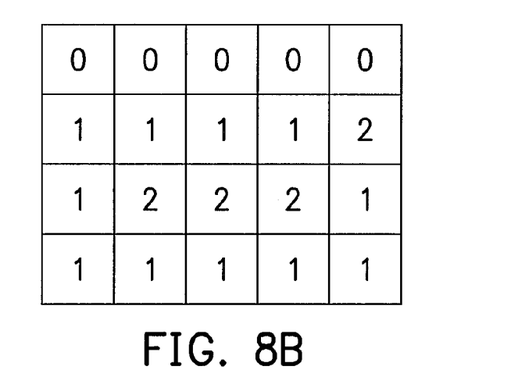

After all possible paths from the pixel 7001 to one of the peripheral pixels are calculated, a minimum of the distances of the paths is equal to 1 and also the same as that of the path P2, so the minimum 1 of the distance is set to be a depth value of the pixel 7001. FIG. 8B depicts calculation results corresponding to the exemplary embodiment of calculating the depth value in FIG. 8A, in which the value on each pixel position is a depth value of the pixel.

The calculation in the flow in FIG. 7 is complex and slow. A flow in FIG. 9 is simplification of the flow in FIG. 7 and the calculation is rapid.

Figure 9:
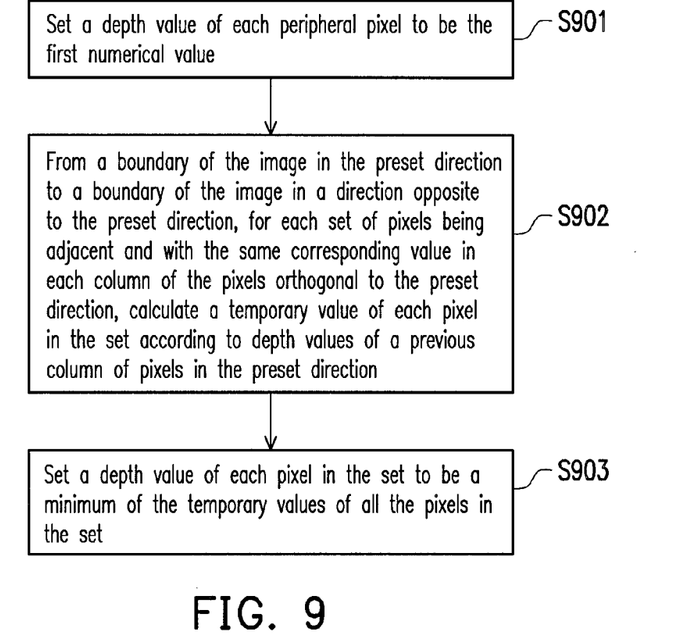
FIG. 9 is a flow chart of another implementation manner of the step of calculating a depth value of each pixel in the image according to the corresponding values of the pixel in the image and a peripheral pixel according to an embodiment of the present invention.

FIG. 9 is a flow chart of another implementation manner of Step S602. Referring to FIG. 9, in Step S901, a depth value of each peripheral pixel is set to be the first numerical value 0. In this embodiment, a preset direction is set to be an upward direction of an image, so peripheral pixels are disposed beside an upper boundary of the image. In Step S902, a plurality of sets is defined according to a corresponding value of each pixel in the image. The set is a set including pixels being adjacent and with the same corresponding value in each column of the pixels orthogonal to the preset direction. The preset direction of this embodiment is the upward direction, so each column of pixels is transverse. The set refers to the largest set that can be formed under the foregoing condition. From a boundary in the preset direction to a boundary in a direction opposite to the preset direction, in this embodiment, from up to down, for each set of each column of pixels, a temporary value of each pixel in the set is calculated according to depth values of a previous column of the pixels in the preset direction, that is, in this embodiment, depth values of an upper column of the pixels. In Step S903, the temporary values of the pixels are compared to obtain a minimum of the temporary values of the pixels, and a depth value of each pixel in the set is set to be the minimum. For the pixels on the boundary in the preset direction, the previous column of pixels in the preset direction is the peripheral pixels. An example is described below with reference to a drawing.

Figure 10:
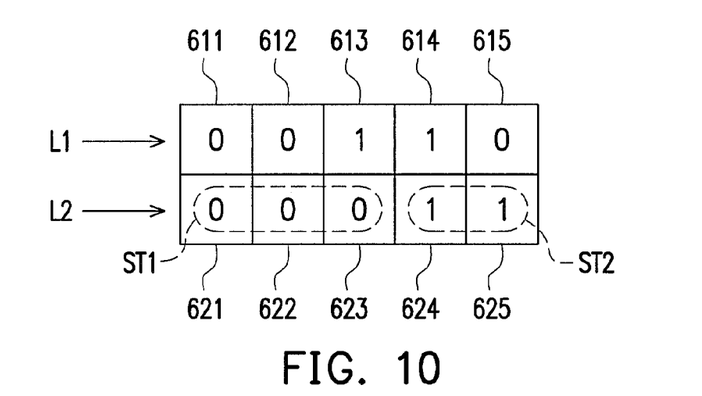
FIG. 10 is a schematic diagram of an implementation manner of the step of calculating a depth value of each pixel in the image according to the corresponding values of the pixel in the image and a peripheral pixel according to an embodiment of the present invention.

FIG. 10 is a schematic diagram of an implementation manner of the flow in FIG. 9. Referring to FIG. 10, three sets exist in a first column L1 and include pixels 611 and 612, pixels 613 and 614, and a pixel 615 respectively, and in the drawing, a numerical value in each pixel position is a corresponding value of each pixel. It can be known form the foregoing calculation method that, the same set has the same depth value. In this embodiment, the pixels 611 and 612 have a depth value D1, the pixels 613 and 614 have a depth value D2, and the pixel 615 has a depth value D3. Before a depth value of a pixel in a second column L2 is calculated, the pixels in the second column L2 are divided so that pixels 621, 622, and 623 form a first set ST1, and pixels 624 and 625 form a second set ST2. In this embodiment, a temporary value of each pixel is equal to a value obtained by adding a depth value of a previous pixel in the preset direction to an absolute value of a difference between corresponding values of the pixel and the previous pixel. The preset direction of this embodiment is the upward direction of the image, so the previous pixel in the preset direction is an upper pixel. The temporary value of each pixel in the first set ST1 can be calculated as follows:

$$TP621 = D1 + |0-0| = D1; \quad (3)$$

$$TP622 = D1 + |0-0| = D1; \quad (4)$$

$$TP623 = D2 + |1-0| = D2+1; \quad (5)$$

where TP621, TP622, and TP623 are temporary values of the pixels 621, 622, and 623, so a minimum of TP621, TP622, and TP623 is a depth value of all the pixels (including the pixels 621, 622, and 623) in the first set ST1.

In the similar way, TP624 and TP625 are set to be temporary values of the pixels 624 and 625 and are calculated in the following equations (6) and (7).

$$TP624 = D2 + |1-1| = D2; \quad (6)$$

$$TP625 = D3 + |0-1| = D3+1; \quad (7)$$

Therefore, a minimum of TP624 and TP625 is a depth value of all the pixels (including the pixels 624 and 625) in the second set ST1.

Figure 11:
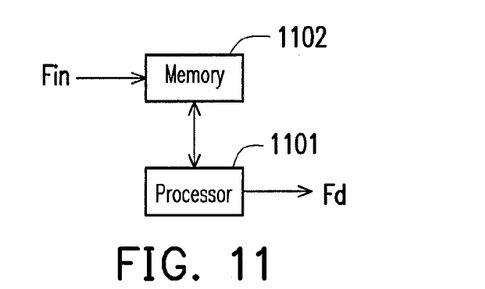
FIG. 11 is a block diagram of an apparatus of image depth estimation according to an embodiment of the present invention.

The present invention also provides an apparatus of image depth estimation, so as to perform the method of image depth estimation. FIG. 11 is a block diagram of an apparatus of image depth estimation according to an embodiment of the present invention. The apparatus of image depth estimation in FIG. 11 includes a processor 1101 and a memory 1102. The memory 1102 is used to store an input image Fin. The processor 1101 can execute the method of image depth estimation according to the foregoing embodiments, that is, the method process shown in FIG. 1 to FIG. 10. During execution, the processor 1101 can record the corresponding value of each pixel determined in Step S203 in the memory 1102 or record the section range determined in Step S403 and Step S404 in the memory 1102. Finally, the processor 1101 sends a calculated depth value Fd to a 3D display apparatus, and the 3D display apparatus converts the image into a 3D image for display by using the depth value. In an embodiment, by using the depth value, the 3D display apparatus can convert the image into two 3D images respectively corresponding to a left eye and a right eye to play a 3D image picture for the left eye and the right eye to watch at the same time.

Figure 12:
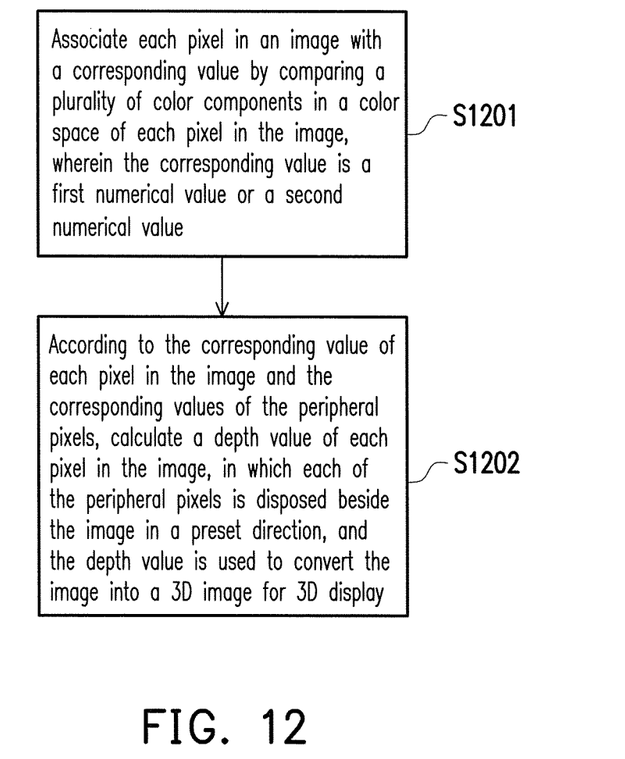
FIG. 12 is a flow chart of steps of a method of image depth estimation according to an embodiment of the present invention.

FIG. 12 is a flow chart of steps of a method of image depth estimation according to an embodiment of the present invention. Referring to FIG. 12, in Step S1201, each pixel in an image is associated with a corresponding value that is either a first numerical value or a second numerical value by comparing all color components of each pixel in the image. In Step S1202, according to the corresponding value of each pixel in the image and a corresponding value of each peripheral pixel, a depth value of each pixel in the image is calculated, in which each of the peripheral pixels is disposed beside the image in a preset direction, and the depth value is used to convert the image into a 3D image to be displayed on a 3D display apparatus. Detailed implantation of the method is the same as that described in the foregoing, so details will not be described herein again.

Figure 13A:
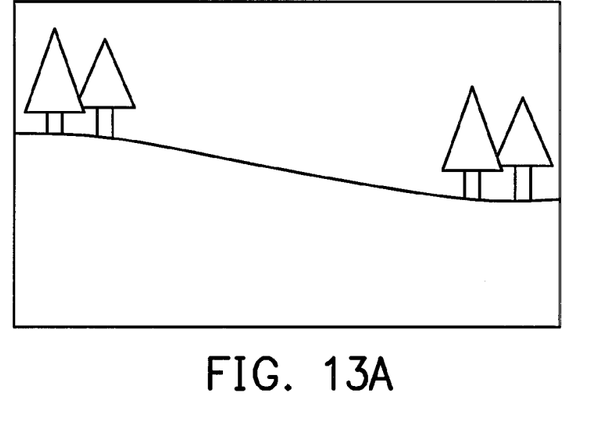
FIG. 13A, FIG. 13B, and FIG. 13C are schematic diagrams of an exemplary embodiment of the present invention.
Figure 13B:
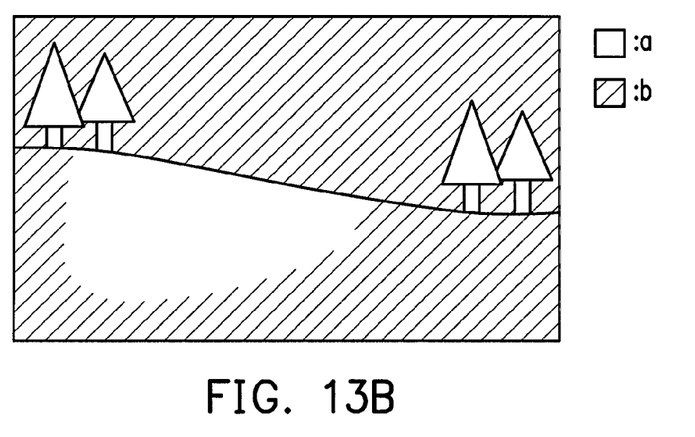
Figure 13C:
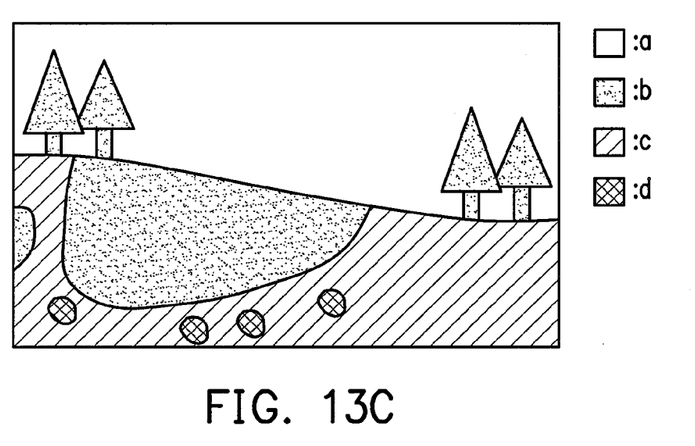

FIG. 13A, FIG. 13B, and FIG. 13C are schematic diagrams of an exemplary embodiment of the present invention. FIG. 13A depicts an original input image Fin. FIG. 13B is corresponding values of pixels of the image Fin, in which corresponding values of pixels in an area a are a first numerical value, that is, hue values of the pixels fall in a section range determined in Step S403 and Step S404. On the contrary, corresponding values of pixels in an area b are a second numerical value. FIG. 13C depicts depth values of the pixels of the image Fin, in which depth values represented by areas a, b, c, and d are increased successively. It should be noted that, in this implementation, the smaller depth value represents a longer distance from a viewer. For example, the area a in FIG. 13C represents the farthest area in the whole image from the viewer.

To sum up, the present invention provides the method of image depth estimation and the apparatus thereof, which can accelerate the image depth value estimation due to the relative simple calculation to achieve the capability of real-time display on the 3D display apparatus. Through the method and the apparatus, the hue values are obtained by using a plurality of different calculation formulas according to the dominant colors of the image and the pixels, so that the subsequent depth value estimation are more rapid and accurate. The present invention also provides two implementation manners for calculating the depth value with different complexity, which can be used in different application conditions.

The technical content of the present invention has been disclosed through embodiments, but is not intended to be limited thereto. Some variations and modifications can be made by persons skilled in the art without departing from the spirit of the present invention, so the protection scope of the present invention is defined by the appended claims.

What is claimed is:

1. A method of image depth estimation, comprising:
   calculating a hue value of each pixel in an image by comparing a plurality of color components in a color space of each pixel in the image;
   associating the hue value of each pixel in the image with a corresponding value, wherein the corresponding value is a first numerical value or a second numerical value; and
   according to the corresponding value of each pixel in the image, calculating a depth value of each pixel in the image, wherein the depth value is used to convert the image into a three-dimensional (3D) image to be displayed on a 3D display apparatus.

2. The method of image depth estimation according to claim 1, wherein the step of calculating the hue value of each pixel in the image by comparing the plurality of color components in the color space of each pixel in the image comprises:
   regarding one of the plurality of color components in each pixel in the image with a maximum gray scale value as a dominant color of the pixel;
   regarding the dominant color of the most pixels in the image as a dominant color of the image; and
   calculating the hue value of each of the pixels according to the dominant color of the image and the dominant color of each of the pixels.

3. The method of image depth estimation according to claim 2, wherein the hue value of each of the pixels is calculated by one of a plurality of different calculation formulas, and each of the calculation formulas corresponds to one of all possible combinations of the dominant color of the image and the dominant color of the pixel that the hue value belongs to.

4. The method of image depth estimation according to claim 2, wherein the step of associating the hue value of each pixel in the image with the corresponding value comprises:
dividing a distribution range of the hue values of the pixels into a preset number of sections;
determining a section range in the sections according to the number of the pixels in each of the sections; and
for each of the pixels, if the pixel is located in the section range, associating the pixel with the first numerical value, and otherwise, associating the pixel with the second numerical value.

5. The method of image depth estimation according to claim 4, wherein the step of determining the section range comprises:
selecting a peak section in the sections, wherein the peak section comprises the most pixels in the sections;
setting the section range to be the peak section;
if a previous section of the section range comprises less pixels than a section in the section range immediately adjacent to the previous section, adding the previous section to the section range;
if a next section of the section range comprises less pixels than a section in the section range immediately adjacent to the next section, adding the next section to the section range; and
repeating the foregoing two steps until no more sections are capable of being added to the section range.

6. The method of image depth estimation according to claim 1, wherein the step of calculating the depth value of each pixel in the image comprises:
disposing a peripheral pixel beside each boundary pixel of the image in a preset direction, and setting a corresponding value of each of the peripheral pixels to be the first numerical value; and
calculating the depth value of each pixel in the image according to the corresponding values of the pixels in the image and the peripheral pixels.

7. The method of image depth estimation according to claim 6, wherein the step of calculating the depth value of each pixel in the image according to the corresponding values of the pixels of the image and the peripheral pixels comprises:
for each pixel in the image, calculating a distance of each path from the pixel to one of the peripheral pixels, wherein the paths are only allowed to turn at right angle in the image, and the distance of each of the paths is a sum of absolute values of differences between the corresponding values of each two adjacent pixels of the path; and
setting the depth value of each pixel in the image to be a minimum of the distances of all the paths from the pixel to one of the peripheral pixels.

8. The method of image depth estimation according to claim 6, wherein the step of calculating the depth value of each pixel in the image according to the corresponding values of the pixels of the image and the peripheral pixels comprises:
setting a depth value of each of the peripheral pixels to be the first numerical value;
from the boundary of the image in the preset direction to a boundary of the image in a direction opposite to the preset direction, for each set of pixels being adjacent and with the same corresponding value in each column of the pixels in the image orthogonal to the preset direction, calculating a temporary value of each pixel in the set according to the depth values of a previous column of pixels in the preset direction; and
setting the depth value of each pixel in the set to be a minimum of the temporary values of all the pixels in the set.

9. The method of image depth estimation according to claim 8, wherein the temporary value of each pixel in the image is equal to a value obtained by adding the depth value of a previous pixel of the pixel in the preset direction to an absolute value of a difference between the corresponding values of the pixel and the previous pixel.

10. An apparatus of image depth estimation, comprising:
a memory, storing an image; and
a processor, calculating a hue value of each pixel in an image by comparing a plurality of color components in a color space of each pixel in the image, associating the hue value of each pixel in the image with a corresponding value, wherein the corresponding value is a first numerical value or a second numerical value, and according to the corresponding value of each pixel in the image, calculating a depth value of each pixel in the image, wherein the depth value is used to convert the image into a three-dimensional (3D) image to be displayed on a 3D display apparatus.

11. The apparatus of image depth estimation according to claim 10, wherein the processor regards one of the plurality of color components in the color space in each pixel in the image with a maximum gray scale value as a dominant color of the pixel, regards the dominant color of the most pixels in the image as a dominant color of the image, calculates the hue value of each pixel in the image according to the dominant color of the image and the dominant color of each of the pixels, determines the corresponding value of each of the pixels according to the hue values of the pixels, and records the corresponding values in the memory.

12. The apparatus of image depth estimation according to claim 11, wherein the hue value of each of the pixels is calculated by one of a plurality of different calculation formulas, and each of the calculation formulas corresponds to one of all possible combinations of the dominant color of the image and the dominant color of the pixel that the hue value belongs to.

13. The apparatus of image depth estimation according to claim 11, wherein the processor divides a distribution range of the hue values of the pixels into a preset number of sections, and determines a section range in the sections according to the number of the pixels in each of the sections; and for each of the pixels, if the pixel is located in the section range, the processor associates the pixel with the first numerical value, and otherwise, the processor associates the pixel with the second numerical value.

14. The apparatus of image depth estimation according to claim 13, wherein the processor selects a peak section in the sections, wherein the peak section comprises the most pixels in the sections; the processor sets the section range to be the peak section; if a previous section of the section range comprises less pixels than a section in the section range immediately adjacent to the previous section, the processor adds the previous section to the section range; if a next section of the section range comprises less pixels than a section in the section range immediately adjacent to the next section, the processor adds the next section to the section range; and the processor repeats the foregoing two steps of adding the previous section and the next section until no more sections are capable of being added to the section range, and then the processor records the section range in the memory.

15. The apparatus of image depth estimation according to claim 10, wherein the processor disposes a peripheral pixel beside each boundary pixel of the image in a preset direction, and sets a corresponding value of each of the peripheral pixels to be the first numerical value; and the processor calculates the depth value of each pixel in the image according to the corresponding values of the pixels of the image and the peripheral pixels.

16. The apparatus of image depth estimation according to claim 15, wherein, for each pixel in the image, the processor calculates a distance of each path from the pixel to one of the peripheral pixels, wherein the paths are only allowed to turn at right angle in the image, and the distance of each of the paths is a sum of absolute values of differences between the corresponding values of each two adjacent pixels of the path; and the processor sets the depth value of each pixel in the image to be a minimum of the distances of all the paths from the pixel to one of the peripheral pixels.

17. The apparatus of image depth estimation according to claim 15, wherein the processor sets a depth value of each of the peripheral pixels to be the first numerical value; from the boundary of the image in the preset direction to a boundary of the image in a direction opposite to the preset direction, for each set of pixels being adjacent and with the same corresponding value in each column of the pixels in the image orthogonal to the preset direction, the processor calculates a temporary value of each pixel in the set according to the depth values of a previous column of pixels in the preset direction; and the processor sets a depth value of each pixel in the set to be a minimum of the temporary values of all the pixels in the set.

18. The apparatus of image depth estimation according to claim 17, wherein the temporary value of each pixel in the image is equal to a value obtained by adding the depth value of a previous pixel of the pixel in the preset direction to an absolute value of a difference between the corresponding values of the pixel and the previous pixel.

19. A method of image depth estimation, comprising:
associating each pixel in an image with a corresponding value by comparing a plurality of color components in a color space of each pixel in the image, wherein the corresponding value is a first numerical value or a second numerical value; and
according to the corresponding value of each pixel in the image and a corresponding value of a peripheral pixel, calculating a depth value of each pixel in the image, wherein each of the peripheral pixels is disposed beside the image in a preset direction, and the depth value is used to convert the image into a three-dimensional (3D) image to be displayed on a 3D display apparatus.

20. The method of image depth estimation according to claim 19, wherein the step of associating the hue value of each pixel in the image with the corresponding value comprises:
regarding one of the plurality of color components in the color space in each pixel in the image with a maximum gray scale value as a dominant color of the pixel;
regarding the dominant color of the most pixels in the image as a dominant color of the image; and
calculating a hue value of each pixel in the image according to the dominant color of the image and the dominant color of each of the pixels; and
determining the corresponding value of each of the pixels according to the hue values of the pixels.

21. The method of image depth estimation according to claim 20, wherein the hue value of each of the pixels is calculated by one of a plurality of different calculation formulas, and each of the calculation formulas corresponds to one of all possible combinations of the dominant color of the image and the dominant color of the pixel that the hue value belongs to.

22. The method of image depth estimation according to claim 20, wherein the step of determining the corresponding value of each of the pixels according to the hue values of the pixels comprises:
dividing a distribution range of the hue values of the pixels into a preset number of sections;
determining a section range in the sections according to the number of the pixels in each of the sections; and
for each of the pixels, if the pixel is located in the section range, associating the pixel with the first numerical value, and otherwise, associating the pixel with the second numerical value.

23. The method of image depth estimation according to claim 22, wherein the step of determining the section range comprises:
selecting a peak section in the sections, wherein the peak section comprises the most pixels in the sections;
setting the section range to be the peak section;
if a previous section of the section range comprises less pixels than a section in the section range immediately adjacent to the previous section, adding the previous section to the section range;
if a next section of the section range comprises less pixels than a section in the section range immediately adjacent to the next section, adding the next section to the section range; and
repeating the foregoing two steps until no more sections are capable of being added to the section range.

24. The method of image depth estimation according to claim 19, wherein the step of calculating the depth value of each pixel in the image according to the corresponding values of each pixel of the image and the peripheral pixel comprises:
setting a corresponding value of each of the peripheral pixels to be the first numerical value;
for each pixel in the image, calculating a distance of each path from the pixel to one of the peripheral pixels, wherein the paths are only allowed to turn at right angle in the image, and the distance of each of the paths is a sum of absolute values of differences between the corresponding values of each two adjacent pixels of the path; and
setting the depth value of each pixel in the image to be a minimum of the distances of all the paths from the pixel to one of the peripheral pixels.

25. The method of image depth estimation according to claim 19, wherein the step of calculating the depth value of each pixel in the image according to the corresponding values of each pixel in the image and the peripheral pixel comprises:
setting a depth value of each of the peripheral pixels to be the first numerical value;
from the boundary of the image in the preset direction to a boundary of the image in a direction opposite to the preset direction, for each set of pixels being adjacent and with the same corresponding value in each column of the pixels in the image orthogonal to the preset direction, calculating a temporary value of each pixel in the set according to the depth values of a previous column of pixels in the preset direction; and
setting the depth value of each pixel in the set to be a minimum of the temporary values of all the pixels in the set.

26. The method of image depth estimation according to claim 25, wherein the temporary value of each pixel in the image is equal to a value obtained by adding the depth value of a previous pixel of the pixel in the preset direction to an absolute value of a difference between the corresponding values of the pixel and the previous pixel.

* * * * *